US009756936B1

(12) United States Patent
Raghavan et al.

(10) Patent No.: US 9,756,936 B1
(45) Date of Patent: Sep. 12, 2017

(54) TROLLEY FOR FOOD HOLDING CABINETS

(71) Applicant: Alto-Shaam, Inc., Menomonee Falls, WI (US)

(72) Inventors: J. K. Raghavan, Mequon, WI (US); Christopher T. Larson, Waukesha, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 0 days.

(21) Appl. No.: 15/293,581

(22) Filed: Oct. 14, 2016

(51) Int. Cl.
    A47B 31/00    (2006.01)
    B62B 3/00     (2006.01)
    B62B 3/10     (2006.01)
    A47J 39/00    (2006.01)

(52) U.S. Cl.
    CPC ............. *A47B 31/00* (2013.01); *A47J 39/006* (2013.01); *B62B 3/005* (2013.01); *B62B 3/108* (2013.01); *A47B 2031/003* (2013.01)

(58) Field of Classification Search
    None
    See application file for complete search history.

(56) References Cited

U.S. PATENT DOCUMENTS

| | | | | |
|---|---|---|---|---|
| 3,537,405 A * | 11/1970 | Verhoeven | ............... | A21B 1/24 219/400 |
| 4,167,983 A * | 9/1979 | Seider | .................. | A47J 39/006 180/19.1 |
| 4,427,379 A * | 1/1984 | Duran | ....................... | B62B 3/00 211/182 |
| 4,757,184 A * | 7/1988 | Swanson | .................. | A21B 2/00 219/386 |
| 5,337,579 A * | 8/1994 | Saia, III | ............... | B60H 1/3226 62/239 |
| 5,403,997 A * | 4/1995 | Wimpee | .................. | A23L 3/365 165/919 |
| 5,568,802 A * | 10/1996 | Buday | ....................... | A21B 1/50 126/21 A |
| 5,718,441 A * | 2/1998 | Kern | ....................... | A47B 57/14 211/187 |
| 5,953,928 A * | 9/1999 | Saia, III | .................... | B66C 1/12 62/239 |
| 6,265,695 B1 * | 7/2001 | Liebermann | ............. | A47J 36/24 219/214 |
| 8,162,330 B2 * | 4/2012 | Melkumyan | ............. | B25H 1/02 280/47.34 |
| 2015/0230479 A1 * | 8/2015 | Foda | ........................ | A21B 1/50 126/337 R |

FOREIGN PATENT DOCUMENTS

EP            2340714 B1    5/2014

* cited by examiner

*Primary Examiner* — J. Allen Shriver, II
*Assistant Examiner* — Hilary L Johns
(74) *Attorney, Agent, or Firm* — Boyle Fredrickson, S.C.

(57) ABSTRACT

The present invention provides a roll-in kitchen unit having an outer housing and a trolley that fits substantially within. The trolley provides a cast frame coupled to a scaling plate for sealing the trolley within the outer housing. In one embodiment, the cast frame is reinforced with inner and outer ribs to minimize deflection of the cast frame and bring the sealing plate into alignment with the corresponding gasket of the outer housing door.

18 Claims, 4 Drawing Sheets

TROLLEY FOR FOOD HOLDING CABINETS

CROSS-REFERENCE TO RELATED APPLICATIONS

Background of the Invention

The present invention relates to trolleys for holding food to be easily rolled into and out of food holding cabinets, and in particular, to a trolley with reinforced supports for reducing air leakage and heat and humidity losses when the trolley is positioned in the holding cabinet.

Food holding cabinets providing storage, refrigeration and/or heating are commonly used by bakeries and food service establishments that prepare large quantities of food in advance to chill or heat food for temporary storage or last-minute finishing. These units aid in high-volume operations to increase an operation's efficiency and speed of service.

Instead of built-in shelving, food holding cabinets may employ a trolley that supports the food on multiple shelves which may be rolled into or out of the food holding cabinet so that the food holding cabinet may be quickly loaded or unloaded. Ideally, the trolley is sized to take full advantage of the volume of the food holding unit and so has outer dimensions closely approximating the interior dimensions of the food holding cabinet. The trolley may have a U-shaped carriage allowing its wheels to sit underneath the floor of the food holding cabinet when the trolley is installed in the food holding cabinet and allowing the door of the food holding cabinet to close. When the door of the food holding cabinet is closed, a sealing plate of the trolley may interface with a corresponding gasket of the door to seal the cabinet and its contents therein.

SUMMARY OF THE INVENTION

The present inventors have recognized that even small amounts of deflection of the trolley, due to varying loads of food products placed on the its multiple shelves, may result in angulation of the trolley's sealing plate making it difficult for a proper seal to be created when the trolley is installed within the food holding cabinet. This is particularly true when the seal requires the trolley's sealing plate to be substantially parallel to the corresponding gasket on the food holding cabinet door, and any unevenness of the ground exacerbates the misalignment of the trolley with the cabinet walls.

Accordingly, the present invention provides a trolley with a reinforced support frame, which prevents angulation of the sealing plate, bringing the sealing plate into alignment with a corresponding gasket of the food holding cabinet door.

In one embodiment, the present invention may be a roll-in trolley for use with a food preparation cabinet having an enclosure providing walls defining a cavity for receiving food through a front opening of the food preparation cabinet, the front opening coverable by a door. The roll-in trolley may include a food rack providing a plurality of lateral supports arranged in a column and adapted for receiving food trays along a lateral direction to rest on the lateral supports; a cantilever frame having lateral supports supporting the food rack thereon; a removable horizontally extending roller frame fitting beneath the enclosure of the oven as moved on rollers extending downwardly from the roller frame; a support frame communicating between a front end of the horizontally extending roller frame and a front end of the cantilever frame so that the roller frame may support the food rack within the enclosure when the roller frame is beneath the enclosure; and a vertically extending sealing plate positioned at an upper end of the support frame and extending over at least a portion of the front opening when the food support rack is installed in the enclosure. The support frame may have a greater unit stiffness than the lateral supports of the cantilever frame so that bending of the cantilever tube frame under weight of the food rack is substantially isolated from the vertically extending sealing plate.

It is thus a feature of at least one embodiment of the invention to attach the sealing plate to a support frame having increased stiffness so that a deflection of the cantilevered frame is not translated to the sealing plate.

The cross-sectional area of the support frame is greater than the cross-sectional area of the lateral supports of the cantilever frame.

It is thus a feature of at least one embodiment of the invention to increase the stiffness of the cantilevered frame by coupling it to a curved support frame with increased lateral and transverse strength.

The support frame consists of multiple vertical elements attaching to corresponding lateral supports and where each vertical element has a cross-sectional area greater than its corresponding lateral support.

It is thus a feature of at least one embodiment of the invention to increase the stiffness in both a horizontal and vertical direction to prevent deflecting or bending of the vertical elements and deflection of the lateral supports.

The support frame is a casting and the lateral supports of the cantilever tube assembly are tubes. The support frame may be cast stainless steel.

It is thus a feature of at least one embodiment of the invention to strengthen the support frames by using cast frames attached to the hollow tubes of preexisting trolley frames.

The support frame includes at least one rib extending along at least one of an inner and outer perimeter of the support frame to provide additional mass to the support frame.

It is thus a feature of at least one embodiment of the invention to increase the stiffness of the support frame by increasing the thickness using ribs providing additional mass and cross sectional area to the frame.

The at least one of the rib has a greater cross sectional area at a mid-point of the vertical element than at peripheral edges of the vertical element.

It is thus a feature of at least one embodiment of the invention to reinforce areas of expected weakness such as near a mid-point of the vertical element when force is applied to the ends.

The support frame provides a vertical element connected at upper and lower ends to upper and lower horizontal elements wherein the connection of the elements is curved.

It is thus a feature of at least one embodiment of the invention to use a unitary frame with reinforced curves to prevent bending between the upper and lower horizontal supports and the vertical support.

Opposite ends of the support frame are inserted into hollowed ends of lateral supports. Opposite ends of the support frame provide plugs having a smaller cross section than a cross section of the support frame.

It is thus a feature of at least one embodiment of the invention to allow the support frame to be adaptable with preexisting trolley frames.

The support frame has a generally round cross section.

It is thus a feature of at least one embodiment of the invention to provide ease of casting.

These particular objects and advantages may apply to only some embodiments falling within the claims and thus do not define the scope of the invention.

DETAILED DESCRIPTION OF THE INVENTION

The Prior Art

Figure 2:
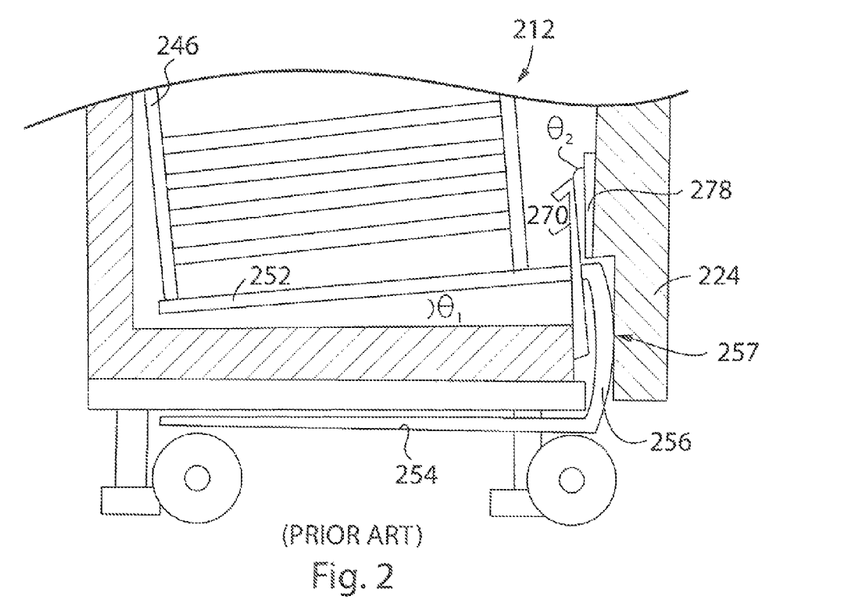
FIG. 2 is a left side cross sectional view of a prior art trolley shown installed within the outer housing and the sealing plate misaligned from a gasket of the front door with deflection of a cantilevered element.

Referring to FIG. 2, a roll-in trolley 212 of the prior art provides tray racks 246 supported below by a cantilevered frame 257 having lateral cantilever supports 252 supporting the racks 246 thereon. The lateral cantilever supports 252 extend parallel to lateral supports 254 of a roller frame extending therebelow and connected therebetween by vertical frames 256. The tubes forming the cantilevered frame 257 have a rectangular cross-section and the cross sectional area is constant throughout the frame 257. Mounted to the lateral cantilever supports 252 is a sealing plate 270, which extends perpendicular to the lateral cantilever supports 252 so that it extends vertically when the lateral cantilever supports 252 are horizontal.

When the trolley 212 carries food on its shelving, the distal end of the racks 246 may be weighted down to deflect the lateral cantilever supports 252, for example, 20-30 mm from a horizontal position. For example, in the exaggerated depiction shown in FIG. 2, the lateral cantilever supports 252 are shown to be sloping downward by an angle $\theta 1$ with respect to horizontal. The deflections of the lateral cantilever supports 252 translate to the sealing plate 270 attached thereto. As a result, angulation of the sealing plate 270 is created consistent with the angulation of the lateral cantilever supports 252. Moreover, the vertical frames 256 may bow outward causing the lateral cantilever supports 252 to deflect further. For example, in the exaggerated depiction of FIG. 2, the sealing plate 270 is angled by an angle $\theta 2$ with respect to vertical. The angulation of the sealing plate 270 causes the face seal between the sealing plate 270 and corresponding sweep gasket 278 of the cabinet door 224 to become misaligned causing air or moisture to leak from the food holding cabinet 210.

THE PRESENT INVENTION

Figure 1:
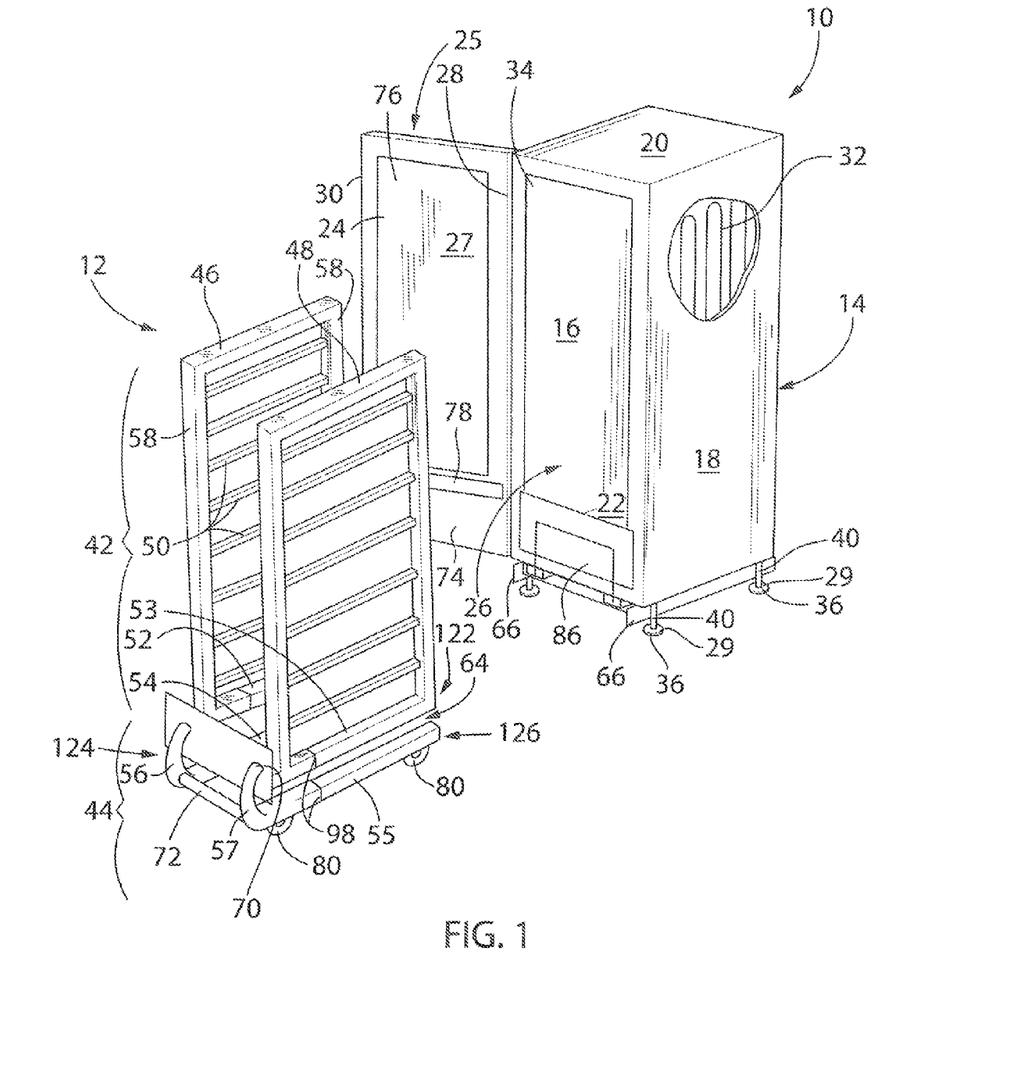
FIG. 1 is a simplified perspective view of the roll-in kitchen unit of the present invention showing an oven housing having a retractable sealing plate and a door closeable over a front opening, and a trolley having its own sealing plate and installable within the oven housing.

Referring now to FIG. 1, a trolley system according to one embodiment of the present invention may provide a food holding cabinet 10 accepting a trolley 12 in a lateral insertion direction. The food holding cabinet 10 has a plurality of walls defining a generally rectangular volume or cavity including a vertically extending back sidewall 14 joined on its left and right edges by transversely opposed vertically extending left 16 and right 18 side walls extending laterally forward from the back sidewall 14. A top wall 20 and bottom wall 22 are joined to the upper and lower edges of the back sidewall 14 and side walls 16, 18, respectively, to define a ceiling and floor of the enclosable volume 34. It is understood that the food holding cabinet 10 refers to any food preparation cabinet including but not limited to holding ovens, cooking ovens, and chillers.

The volume 34 may be accessed through a door 24 closeable over a front opening 26 and which seals the interior of the volume 34 when the door 24 is in a closed position. The door 24 may be connected by a hinge 28 attached to, for example, a vertical edge of the left sidewall 16. The door 24 has a substantially planar outer surface 25 opposite an inner surface 27 interfacing with the front opening 26. A lower portion 74 of the inner surface 27 of the door 24 may be recessed to provide a generally rectangular space or depression set back from a generally rectangular upper portion 76 of the inner surface 27 so that the trolley 12 may be installed within the food holding cabinet 10 without interfering with the door 24 closure. An upper, left and right edge of the upper portion 76 of the door 24 may have a door gasket 30 or other sealing material for sealing the connection between the door 24 and the walls 16, 18, 20 of the volume 34. A sweep gasket 78 may be installed on the inner surface 27 of the lower edge of the upper portion 76 for sealing the connection between the door 24 and the trolley 12 when the trolley 12 is installed within the food holding cabinet 10 as will be described in further detail herein. The door gasket 30 and sweep gasket 78 are configured to seal the trolley 12 shelving within the volume 34 when the door 24 is closed as will be described in further detail herein.

The left and right side walls 16, 18 and back sidewall 14 of the volume 34 may incorporate an inner electrical coil 32, which provides heat or cooling to the volume 34. A water source such as a water jet or boiler (not shown) may also provide water to the volume 34, for example, for optional steam cooking. The left and right sidewalls 16, 18, back sidewall 14, top and bottom walls 20, 22 may further incorporate an insulating material so as to retain heat or cooling air within the volume 34 and to prevent heat or cooling air from escaping. It is understood that the kitchen unit may have the required electrical circuitry and connections to properly power the unit and control the internal temperature, as is currently understood in the art.

The food holding cabinet 10 may be supported on the ground by a number of supporting feet 36 disposed below the volume 34 and extending down from the bottom wall 22 to control and provide vertical elevation to the volume 34. According to one embodiment of the present invention, the supporting feet 36 are adjustable and positioned at each of the four corners of the exterior surface of the bottom wall 22 of the volume 34. The supporting feet 36 are defined by a generally circular spreader 29 making contact with the ground and connected to an adjustable column 40 extending upward therefrom. The circular spreader 29 provides an expanded contact surface to spread out the weight supported thereon to prevent gouging of the floor. The adjustable column 40 is in one embodiment, an externally threaded rod that is adjustable by rotation within a corresponding internally threaded sleeve (not shown) fixed with respect to the walls of the food holding cabinet 10 for lengthening and shortening its length and thus changing its height with respect to the ground.

It will be understood that the adjustable support feet 36 may be separately lengthened or shortened such that the vertical height of the four corners of the food holding cabinet 10 is independently adjusted with respect to the floor in order to level the food holding cabinet 10, that is, to orient its walls vertically. This serves the intended purpose of providing leveling to the food holding cabinet 10 on uneven surfaces. In addition, the adjustable support feet 36 provide vertical separation between the bottom wall 22 of the food holding cabinet 10 and the floor such that there is a free passage of air and water therebetween the feet 36 to facilitate in cleaning and remove the food holding cabinet 10 from potential source of contamination.

Still referring to FIG. 1, the trolley 12 may be substantially received into the food holding cabinet 10 and encloseable therein. An upper portion 42 of the trolley 12 holding the food to be processed is received within the enclosable volume 34 while a bottom portion 44 of the trolley 12 having a cantilevered support 122, support structure 124, and roller frame 126 with trolley wheels 80 remains outside and below the food holding cabinet 10 to eliminate contamination.

In one embodiment, the trolley 12 has two vertically extending ladder racks 46, 48 to its left and right respectively which extend upward along and parallel to the left and right oven sidewall 16, 18 when installed within the volume 34. The height and lateral depth of the ladder racks 46, 48 are commensurate with a height and depth of the left and right oven sidewall 16, 18. The ladder racks 46, 48 may be provided by vertical side rails 58 at front and rear corners of the left and right oven sidewall 16, 18 respectively joined by a plurality of laterally extending, horizontal shelf supports 50 therebetween. Cooking shelves (not shown) may be positioned directly onto the shelf supports 50 when installed onto the supports 50 in a lateral direction.

The cooking shelves are able to support pans or trays of food of conventional shape and size. It is contemplated that the cooking shelves may be installed in a number of different configurations so that different pan and tray heights may be held. The cooking shelves are easily installed and uninstalled for cleaning and maintenance. Alternatively, the supports 50 may hold the food pans or trays directly by accepting the lip or handle of the pan or tray thereon without the use of shelving.

The left ladder rack 46 and right ladder rack 48 are supported below by a cantilevered support 122 having lateral cantilever shelf beams 52, 53 supporting the ladder racks 46, 48 thereon. The left ladder rack 46 is supported at its lower edges by the upper surface of a left lateral shelf beam 52 and the right ladder rack 48 is supported at its lower edges by the upper surface of right lateral shelf beam 53. The lateral cantilever shelf beams 52, 53 extend above and parallel to left and right lateral roller supports 54, 55 of a rectangular roller frame 126, the latter being a generally rectangular frame having wheels 80 in each of its corners. The rectangular roller frame 126 extends below the shelf beams 52 and 53 and is connected at its lateral front end to the lateral front ends of the shelf beams 52 and 53 by a support structure 124 constructed of upward extensions 56, 57. The upward extensions 56, 57 may be connected at a front lateral end by a horizontal transverse connecting bar 72 extending between the left upward extension 56 and right upward extension 57. A rear end of the ladder racks 46, 48 may be attached to the rear lateral end of lateral cantilever shelf beams 52, 53 and a front end of the ladder racks 46, 48 may be attached to the upward extensions 56, 57.

The lateral cantilever shelf beams 52, 53 and lateral roller supports 54, 55 may be constructed of hollow tubes having a generally rectangular cross sectional profile and constant cross sectional area. The tubes may be constructed of a metal, such as stainless steel. A front end 98 of the lateral cantilever shelf beams 52, 53 and lateral roller supports 54, 55 provide openings 99 having a generally rectangular cross section allowing insertion of mating plugs 96 of the upward extensions 56, 57 therein as will be described.

Figure 4:
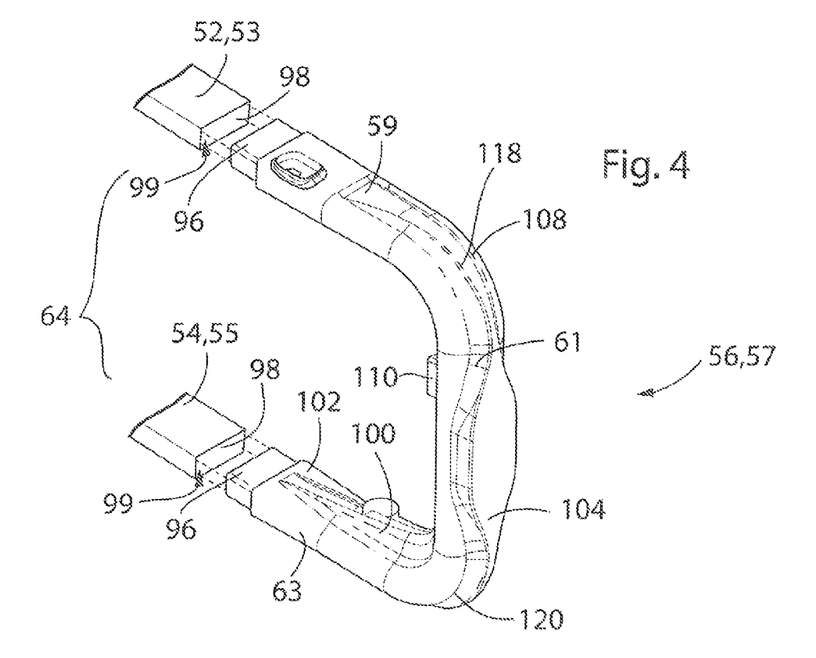
FIG. 4 is a perspective view of the reinforced cast frame being inserted within hollowed tubes of the cantilevered element.

Referring also to FIG. 4, the upward extensions 56, 57 have a generally U shape defined by upper 59 and lower 63 horizontal portions connected to a vertical body portion 61 by upper 118 and lower 120 junction portions respectively. The upper 118 and lower 120 junction portions provide curved connections between right angle ends such that the upper 59 and lower 63 horizontal portions extend substantially perpendicular to the vertical body portion 61. In this respect, the ladder racks 46, 48 are attached to the upper horizontal portion 59 of the upward extensions 56, 57 with the vertical portion 61 of the upward extensions 56, 57 extending in front of the ladder racks 46, 48.

The upward extensions 56, 57 provide plugs 96 extending outwardly from the distal ends of the upper 59 and lower 63 horizontal portions for attachment to the lateral cantilever shelf beams 52, 53 and lateral roller supports 54, 55, respectively. The plugs 96 are sized to fit within the openings 99 formed within the front ends 98 of the lateral cantilever shelf beams 52, 53 and lateral roller supports 54, 55. The plugs 96 are shaped to match the shape of the lateral cantilever shelf beams 52, 53 and lateral roller supports 54, 55 thus allowing the insertion of the plugs 96 into the openings 99 of the lateral cantilever shelf beams 52, 53 and lateral roller supports 54, 55. For example, the plugs 96 may have a rectangular cross section sized slightly smaller than the rectangular openings 99 so as to be inserted therein. The plugs 96 may be friction fitted within the openings 99 or spot welded to otherwise secure the plugs 96 to the front ends 98. The plugs 96 may be approximately 1-2 inches in length to extend a distance within the openings 99. It is understood that the plugs 96 may have a different cross sectional shape from the rest of the upward extensions 56, 57 so as to allow the upward extensions 56, 57 to be attached to tubes or trolley supports of a different shape or size from the upward extensions 56, 57.

Figure 5:
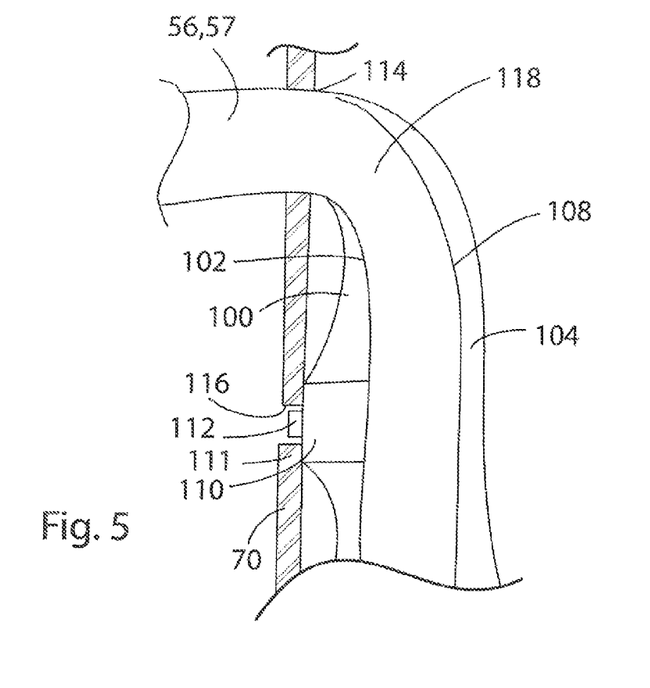
FIG. 5 is a fragmentary side elevation view of an upper end of the reinforced support frame showing the sealing plate welded to the reinforced support frame and having a protruded tab to assist with alignment.
Figure 6A:
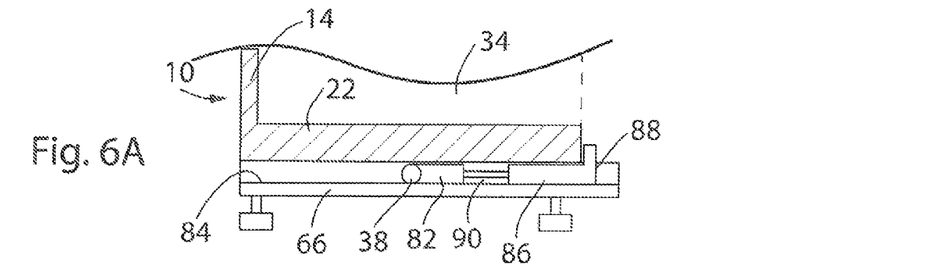
FIGS. 6A-6D are fragmentary side elevation views of the lower end of the oven housing showing the retractable sealing plate moved from a stowed position beneath the oven housing to an installed position extending over an opening of the oven housing to seal the housing when the door is closed over the front opening and the trolley is removed.
Figure 6B:
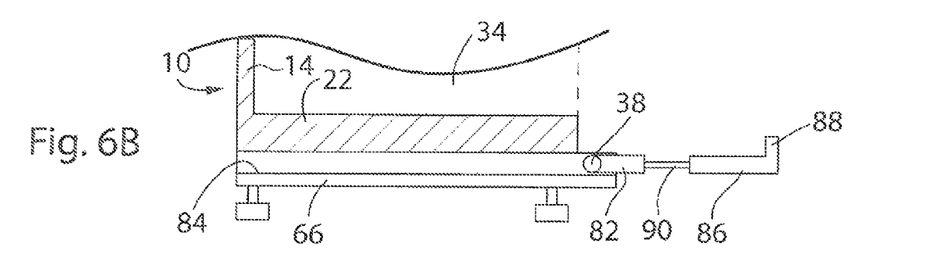
Figure 6C:
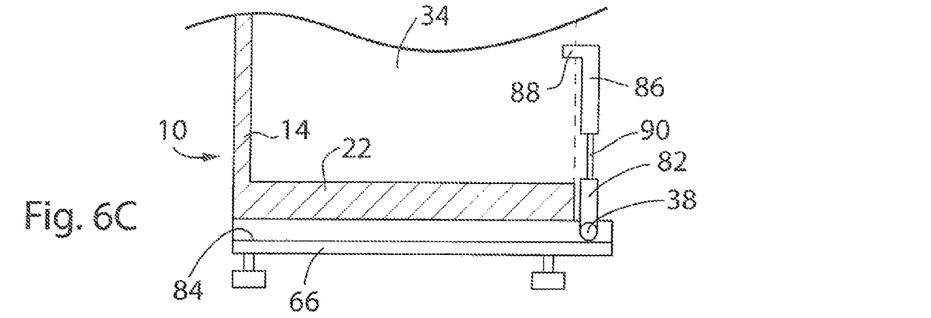
Figure 6D:
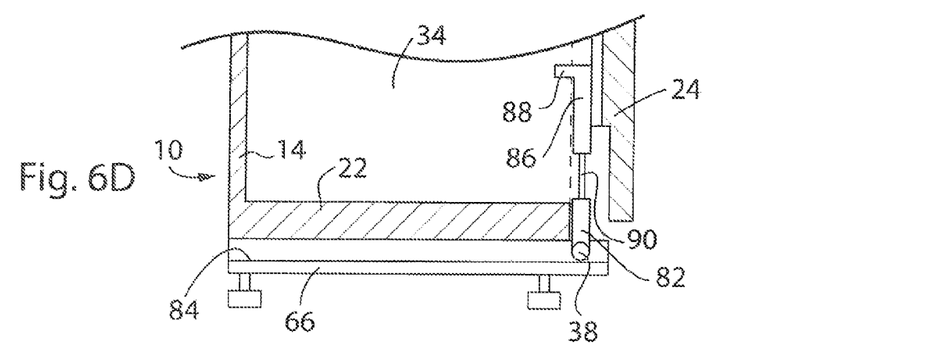

Referring to FIGS. 4 and 5, the upward extensions 56, 57 may be cast metal having a generally non-rectangular solid cross section with a laterally frontward (outwardly) extending outer rib 104 and laterally rearwardly (inwardly) extending inner rib 100 on each of the upper 59 and lower 63 horizontal portions and vertical body portion 61 to provide additional stiffness at areas of expected deflection. Momentarily ignoring the outer rib 104 and inner rib 100, the cross-sectional area of material of the vertical body 61 is generally greater than the cross-sectional area of material of the connecting lateral roller supports 54 and 55 and the cantilevered shelf beams 52 and 53 to provide a greater unit stiffness in the upward extensions 56 and 57. The lateral cross-sectional width of the vertical body 61 and the lateral/vertical cross-sectional extent of the upper 118 and lower portion 120 is further increased by the outer rib 104 and inner rib 100. The inner rib 100 may increase in transverse thickness at the vertical body portion 61 thinning at the upper 59 and lower 63 horizontal portions. Likewise the transverse width of the inner rib 100 may also vary within the upper 59 and lower 63 horizontal portions and vertical body portion 61, respectively, being laterally thickest at the vertical body portion 61. This thickening is intended to increase the cross sectional area at a midpoint of the vertical body portion 61 without further increasing its lateral width. The inner rib 100 may also increase in transverse thickness at the inner curve of the upper 118 and lower 120 junctions. It is understood that the thickening of the upper 59 and lower 63 horizontal portions and vertical body portion 61 may also be applied by the outer rib 104 similar to the inner rib 100 in a similar manner.

Referring to FIGS. 1 and 5, a vertically and transversely extending sealing plate 70 may be positioned at an upper end of the vertical body portion 61 and attached to the upper horizontal portion 59. The sealing plate 70 may be a rectangular piece of metal, such as stainless steel sized to cover a lower front opening of the food holding cabinet 10. In this respect, the transverse width of the sealing plate 70 generally corresponds to or may be slightly wider than a width between the left and right oven sidewall 16, 18 of the cabinet 10 defining the front opening 26. The height of the sealing plate 70 may correspond with or be slightly greater than the distance between the bottom wall 22 of volume 34 and the sweep gasket 78 of the door 24 so that the sealing plate 70 may interface with the bottom wall 22 on a bottom end and the sweep gasket 78 on an upper end. The sealing plate 70 is secured to the upper horizontal portion 59 of the upward extensions 56, 57 but may also or alternatively be secured to the lower horizontal portion 63. The sealing plate 70 is oriented generally perpendicular to the upper horizontal portion 59 and may abut the inner surface 102 of the vertical body portion 61. The sealing plate 70 may be welded or otherwise secured to the upward extensions 56, 57 for example, by extending the upper horizontal portions 59 through hole openings 114 of the sealing plate 70 having a diameter which corresponds to the diameter of the upper horizontal portions 59 and then welding the upward extensions 56, 57 to the sealing plate 70 proximate to the openings 114.

The upward extensions 56, 57 may provide a positioning tab 110 extending from the inner surface 102 of the vertical body portion 61 to assist in installing the sealing plate 70 at the desired angle with respect to the vertical body portion 61, for example, securing the sealing plate 70 parallel to the vertical body portion 61 and perpendicular to the upper horizontal portion 59. The positioning tab 110 may be a generally rectangular protuberance resembling a plateau having a flat locating surface 111 abutting the sealing plate 70 to provide a desired angle of the sealing plate 70. The flat locating surface 111 may also include a button 112 corresponding to an opening 116 of the sealing plate 70 for fitting therein to confirm proper alignment of the sealing plate 70 with respect to the vertical body portion 61. The button 112 may be press fitted into the hole opening 116 of the sealing plate 70 or may be spot welded to secure the sealing plate 70 to the positioning tab 110.

Referring again to FIG. 1, the trolley 12 is supported beneath by a roller frame 126 carrying a number of trolley wheels 80 attached to the lateral roller supports 54, 55 of the roller frame 126 and lower horizontal portions 63 of the upward extensions 56, 57, respectively, and disposed at the respective corners of the trolley 12. The trolley wheels 80 may be attached to casters, which provide 360-degree swivel or pivoting of the wheel about a vertical axis perpendicular to the axis of rotation of the wheel. When the trolley 12 is installed within the volume 34, the roller frame 126 and trolley wheels 80 remain outside of the volume 34 so as to prevent dirt and debris from entering the volume 34.

Figure 3:
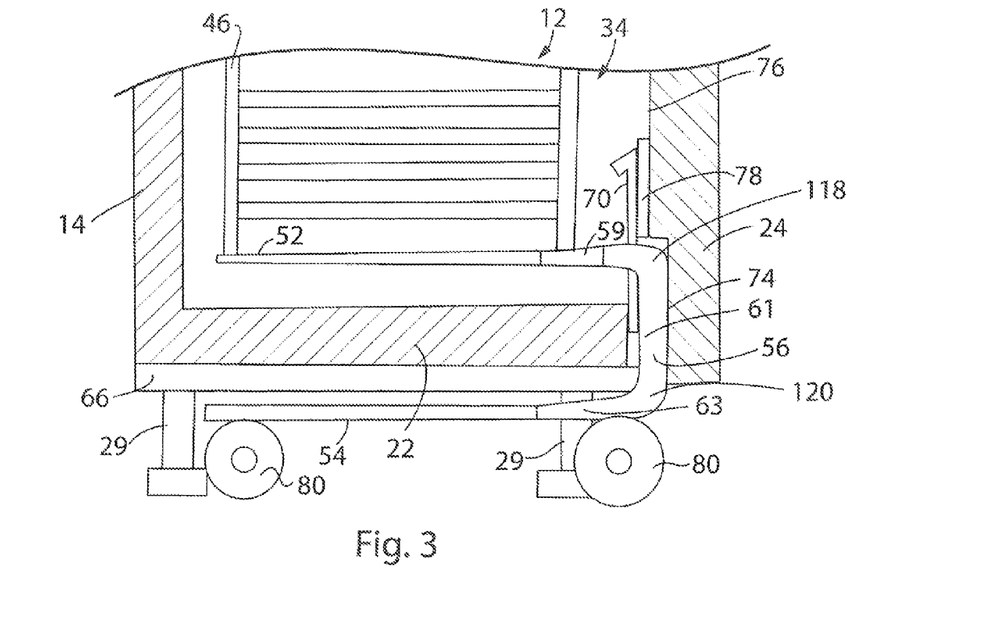
FIG. 3 is a left side cross sectional view of the trolley of the present invention shown installed within the housing and the sealing plate aligned with the gasket of the front door to create a proper seal.

Referring to FIGS. 1 and 3, a horizontally extending space or gap 64 exists between the lateral cantilever shelf beams 52, 53 and lateral roller supports 54, 55, respectively, between which the bottom wall 22 of the food holding cabinet 10 may be received. The gap 64 is confined by the vertical limitations provided by the lateral cantilever shelf beams 52, 53 and lateral roller supports 54, 55 and by the horizontal limitations provided by the sealing plate 70. The gap 64 is sized to receive a front lateral edge of the bottom wall 22 of the volume 34. When the trolley 12 is installed within the volume 34, the gap 64 receives the bottom wall 22 to a depth substantially similar to the depth of the bottom wall 22. The sealing plate 70 at the front end of the trolley 12 prohibits further entry of the trolley 12 into the volume 34.

When the trolley 12 is installed within the volume 34, the ladder racks 46, 48 and the lateral cantilever shelf beams 52, 53 are disposed within the interior of the volume 34. The horizontal transverse connecting bar 72 and the upward extensions 56, 57 remain partially outside the volume 34 but the sealing plate 70 abuts the sweep gasket 78 of the inner surface 27 of the door 24 to allow the door to sealingly close thereover. In this respect, the sweep gasket 78 of the upper portion 76 of the door 24 which extends across a width of the door 24 contacts the sealing plate 70 of the trolley 12, which also extends across a width of the door 24, to create a face seal between the door 24 and the sealing plate 70. When the trolley 12 is installed within the volume 34, the lateral roller supports 54, 55 are located beneath the bottom wall 22 of volume 34.

Referring to FIG. 3, in operation, when the shelving of the trolley 12 carries food, the distal end of the ladder racks 46, 48 remains substantially horizontal. In this respect, the upward extensions 56, 57 increase the stiffness of the lateral cantilever shelf beams 52, 53 and lateral roller supports 54, 55 so that the sealing plate is isolated from deflection. Moreover, the upper 59 and lower 63 horizontal portions of the upward extensions 56, 57 remain substantially horizontal and vertical body portions 61 of the upward extensions 56, 57 remain substantially vertical, thus allowing the sealing plate 70 to remain substantially vertical and allowing the sealing plate 70 to face seal with the substantially vertical sweep gasket 78 of the door 24 in a desired manner. The sweep gasket 78 may have an increased width and height to more easily interface with the sealing plate 70.

Referring to FIGS. 1 and 6, the food holding cabinet 10 may be optionally installed with a retractable sealing plate 86 to seal the cabinet 10 when the trolley 12 in not installed therein. Left and right guide rails 66 may be positioned beneath the food holding cabinet 10 and attached below the volume 34 to extend horizontally along the length of the left and right oven sidewall 16, 18. The left and right guide rails 66 provide an inwardly extending ledge 84 of the guide rails 66. A retractable sealing plate 86 is connected to extender bars 90 coupling the sealing plate 86 to a swivel base 82 having wheels 38 that are receivable onto the ledge 84 of the guide rails 66 so as to allow the swivel base 82 and sealing plate 86 to slide from beneath the food holding cabinet 10 to a position in front of the food holding cabinet 10.

Referring still to FIG. 6, the swivel base 82 allows for the progressive movement of the retractable sealing plate 86 as the retractable sealing plate 86 is extended from beneath the food holding cabinet 10, to an extension in front of the food holding cabinet 10, and finally pivoted upward over the front opening of the volume 34. As seen in FIG. 6A, when the retractable sealing plate 86 is in a retracted position, the swivel base 82 and extender bars 90 are stored beneath the food holding cabinet 10 with the sealing plate 86 substantially stowed beneath the food holding cabinet 10 with the exception of, optionally, a lip 88 of the sealing plate 86 extending in front of the cabinet 10 to assist in gripping the plate 86. As seen in FIG. 6B, as the plate 86 is pulled outward from beneath the food holding cabinet 10, the wheels 38 glide along the ledge 84 of the guide rails 66 of the left and right sides of the volume 34 until the swivel base 82 clears the bottom wall 22 of the volume 34. Referring to FIG. 6C, when the sealing plate 86 is fully extended, the wheel 38 of the swivel base 82 allows the swivel base to pivot upward to lift the sealing plate 86 upward toward the volume 34 opening. An upper ridge of the guide rails 66 may prevent the wheels 38 from being removed from the ledge 84. In this position, the extender bars 90 may elevate the sealing plate 86 so that a lower end of the sealing plate 86 contacts the bottom wall 22 and an upper end of the sealing plate 86 extends over the volume opening as seen in FIG. 1. Referring to FIG. 6D, when the door 24 of the food holding cabinet 10 is closed over the volume 34, the upper end of the sealing plate 86 face seals with the sweep gasket 78 of the door 24 to seal the connection between the bottom wall 22 and the door 24 when the trolley 12 is not installed therein.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" should be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A roll-in trolley for use with a food preparation cabinet having an enclosure providing walls defining a cavity for receiving food through a front opening of the food preparation cabinet, the front opening coverable by a door, the roll-in trolley comprising:
   a food rack providing a plurality of lateral supports arranged in a column and adapted for receiving food trays along a lateral direction to rest on the lateral supports;
   a cantilever frame having lateral supports supporting the food rack thereon;
   a horizontally extending roller frame removably fitting beneath the enclosure of the food preparation cabinet as moved on rollers extending downwardly from the roller frame;
   a support structure adapted to support a front end of the horizontally extending roller frame and a front end of the cantilever frame so that the roller frame may support the food rack within the enclosure when the roller frame is beneath the enclosure;
   a vertically extending sealing plate positioned at an upper end of the support structure and extending over at least a portion of the front opening when the food support rack is installed in the enclosure;
   wherein the support structure has a greater unit stiffness than the unit stiffness of the lateral supports of the cantilever frame so that bending of the cantilever frame under weight of the food rack is substantially isolated from the vertically extending sealing plate; and
   wherein the support structure includes at least one outwardly extending rib along at least one of an inner and outer perimeter of the support structure to increase a cross sectional mass of the support structure.

2. The roll-in trolley of claim 1 wherein a cross-sectional area of the support frame is greater than the cross-sectional area of the lateral supports of the cantilever frame.

3. The roll-in trolley of claim 1 wherein the support structure consists of multiple vertical elements attaching to corresponding lateral supports and wherein each vertical element has a cross-sectional area greater than its corresponding lateral support.

4. The roll-in trolley of claim 1 wherein the support structure is a casting and the lateral supports of the cantilever frame are tubes.

5. The roll-in trolley of claim 4 wherein the support structure is cast stainless steel.

6. The roll-in trolley of claim 4 wherein the support structure has a non-rectangular cross section.

7. The roll-in trolley of claim 1 wherein the at least one rib has a greater cross sectional area at a mid-point of the support structure than at peripheral edges of the support structure.

8. The roll-in trolley of claim 7 wherein the support structure provides a vertical element connected at upper and lower ends to upper and lower horizontal elements wherein the connection of the elements is curved and wherein the at least one rib has a greater cross sectional area at the curved connections.

9. The roll-in trolley of claim 8 wherein ends of the support structure are inserted into hollowed ends of the lateral supports.

10. The roll-in trolley of claim 9 wherein ends of the support structure provide protuberances having a smaller cross sectional area than a cross sectional area of the support structure.

11. A roll-in trolley for use with a food preparation cabinet having an enclosure providing walls defining a cavity for receiving food through a front opening of the food preparation cabinet, the front opening coverable by a door, the roll-in trolley comprising:
   a food rack providing a plurality of lateral supports arranged in a column and adapted for receiving food trays along a lateral direction to rest on the lateral supports:
   a cantilever frame having lateral supports supporting the food rack thereon;
   a horizontally extending roller frame removably fitting beneath the enclosure of the food preparation cabinet as moved on rollers extending downwardly from the roller frame;
   a support structure adapted to support a front end of the horizontally extending roller frame and a front end of the cantilever frame so that the roller frame may support the food rack within the enclosure when the roller frame is beneath the enclosure;
   a vertically extending sealing plate positioned at an upper end of the support structure and extending over at least a portion of the front opening when the food support rack is installed in the enclosure;
   wherein the support structure has a greater unit stiffness than the unit stiffness of the lateral supports of the cantilever frame so that bending of the cantilever frame under weight of the food rack is substantially isolated from the vertically extending sealing plate
   wherein the support structure includes an alignment tab extending from the support structure and providing a flat locating surface positioned to abut the sealing plate and provide alignment of the sealing plate with respect to the vertical support.

12. The roll-in trolley of claim 11, wherein the alignment tab provides a button extending from the flat locating surface for insertion into a hole of the sealing plate to confirm alignment.

13. A food preparation cabinet comprising:
   an enclosure providing walls defining a cavity for receiving food through a front opening coverable by a door having a gasket extending across a width of the door; and
   a roll-in trolley adapted to be received within the enclosure including
   an upper end having a food rack providing a plurality of lateral supports arranged in a column and adapted for receiving food trays along the lateral direction to rest on the lateral supports, and
   a lower end having
   a cantilever frame having lateral supports supporting the food rack thereon;
   a horizontally extending roller frame removably fitting beneath the enclosure of the cabinet as moved on rollers extending downwardly from the roller frame;
   a support structure adapted to support a front end of the horizontally extending roller frame and a front end of the cantilever frame so that the roller frame may support the food rack within the enclosure when the roller frame is beneath the enclosure;
   a vertically extending sealing plate positioned at an upper end of the support structure and extending over at least a portion of the front opening when the food support rack is installed in the enclosure;
   wherein the support structure has a greater unit stiffness than the unit stiffness of the lateral supports of the cantilever frame so that bending of the cantilever tube frame under weight of the food rack is substantially isolated from the vertically extending sealing plate
   wherein the support structure provides upper and lower horizontal elements connected to a vertical element at curved connections.

14. The food preparation cabinet of claim 13 wherein the cross-sectional area of the support structure is greater than a cross-sectional area of the lateral supports of the cantilever frame.

15. The food preparation cabinet of claim 14 wherein the vertical element has a cross-sectional area greater than the upper and lower horizontal elements.

16. The food preparation cabinet of claim 13 wherein the support structure is a casting and the lateral supports of the cantilever tube assembly are tubes.

17. The food preparation cabinet of claim 13 wherein the greater cross-sectional area is provided by ribs providing additional mass on at least one of an inner and outer perimeter of the support structure.

18. The food preparation cabinet of claim 17 wherein the ribs provide greater cross sectional area toward a center of the support structure compared to peripheral ends of the support structure.

* * * * *